United States Patent [19]

Nakamura et al.

[11] Patent Number: 4,677,036
[45] Date of Patent: Jun. 30, 1987

[54] METHOD OF PRODUCTION OF THIN FILM MAGNETIC HEAD AND MAGNETIC HEAD

[75] Inventors: Tsuneo Nakamura, Nara; Hidenori Yamasaki, Yamatokoriyama; Tohru Kira, Tenri; Mitsuhiko Yoshikawa, Ikoma, all of Japan

[73] Assignee: Sharp Kabushiki Kaisha, Osaka, Japan

[21] Appl. No.: 823,941

[22] Filed: Jan. 29, 1986

[30] Foreign Application Priority Data

Jan. 29, 1985 [JP] Japan ................................. 60-17623

[51] Int. Cl.[4] ................................................ G11B 5/66
[52] U.S. Cl. ..................................... 428/694; 156/643; 156/646; 156/663; 156/667; 204/192.23; 360/126; 360/127; 427/38; 427/116; 427/124; 427/130; 427/131; 427/132; 427/255.3; 428/457; 428/469; 428/900; 204/192.34
[58] Field of Search ............... 428/694, 457, 469, 900; 156/643, 646, 663, 667; 204/192 D, 192 E, 192 EC; 360/126, 127; 427/38, 116, 124, 130, 131, 132, 255.3

Primary Examiner—Bernard D. Pianalto
Attorney, Agent, or Firm—Birch, Stewart, Kolasch & Birch

[57] ABSTRACT

There provides a process for preparing a coil type thin film magnetic head having high density record by planarization differences in level caused by an electroconductive coil holded between upper and lower magnetic cores.

4 Claims, 6 Drawing Figures

METHOD OF PRODUCTION OF THIN FILM MAGNETIC HEAD AND MAGNETIC HEAD

BACKGROUND OF THE INVENTION

1. Field of the Invention

The present invention relates to a process for preparing a thin film magnetic head having an excellent high density record property, more particularly, to a planarization process of an irregular surface caused by the existence of an electroconductive coil after forming a dielectric layer.

2. State of the Art Discussion

A conventional process for preparing coil type thin film magnetic heads and their construction is illustrated based on the drawings. FIG. 2 shows one embodiment of a coil type thin film magnetic heads prepared by a conventional method. A soft magnetic thin film, composed of Ni-Fe, Fe-Al-Si or Co-based amorphous alloys, is formed on a substrate 1 having good wear resistance, composed of alumina, ferrite, glass and the like, by means of sputtering, electron beam evaporation and the like and then etched to a desired shape by way of wet etching, ion beam etching and the like to form a lower magnetic core 2. On the lower magnetic core 2, an insulation layer 3 is formed, wherein electroconductive coil 4 is embedded in the insulation layer 3. The insulation layer 3 is made from $SiO_2$, $Si_3N_4$, $Al_2O_3$ and the like by way of plasma-CVD, sputtering or electron bem evaporation. The electroconductive coil 4 is made from an electroconductive metal, such as Cu, Al and the like by way of electron beam vaporation, sputtering and the like. The electroconductive coils 4 are shaped to desired forms by wet etching or a ion beam etching. A general process for preparing the insulation layer 3 and the electroconductive coil 4 comprises forming the insulation layer 3, forming and etching the electroconductive coil 4, forming the remaining insulation layer 3, etching and forming a front magnetic gap layer and etching the insulation layer 3 to form a back core connection portion. Lastly, a soft magnetic layer 5, made from Ni-Fe, Fe-Al-Si, or Co-based amorphous alloy, is coated by sputtering, electron beam evaporation and the like and shaped by way of ion beam etching, wet etching and the like to form an upper magnetic core 5. In the process mentioned above, it is difficult that differences in level, caused by existence of the electroconductive coil 4, are sufficiently planarized. They induce irregular surface of the upper magnetic core 5.

However, in order to comply with the recent requirement for high density record, narrowing of truck and gap has been extensively studied in the field of thin film magnetic heads. This narrowing of truck and gap mainly requires accurate microproducing technique in the preparation process of the thin film magnetic heads. A dry process technique which has been presently used is capable of microfabrication to a considerable extent. Even in such dry processes, sufficient microfabrication is not obtained unless a lower portion of the thin film magnetic heads is sufficiently planarized. On the other hand, in the thin film magnetic heads, especially multi-track magnetic heads, plural layer construction is necessary for ensuring sufficient coil winding numbers for characteristics of magnetic heads. Accordingly, a desirable microfabrication by the conventional processes can not be accomplished unless planarization of differences in level caused by the electroconductive coil is sufficiently carried out.

Further, the irregular surface of the coil 4 has effects not only on the fabrication technique but also on magnetic properties of the upper magnetic core. In other words, the differences in level of the electroconductive coil causes irregular surface of the soft magnetic thin film (i.e. upper magnetic core), for which the magnetic properties of the soft magnetic thin film declines to cause problems, such as producing inferior permeability. These problems become very significant in a high frequency range.

As mentioned above, the planarization of the irregular surface is an important problem required from both fabrication technique and magnetic head properties. In order to comply with the requirement, there have been proposed a lift-off process and a planarization process by coating organic insulation materials such as a polyimide resist and the like. The lift-off process comprises forming an electroconductive coil layer, shaping to a desirable coil form with a photo-resist and then lamination of the insulation layer on the photo-resist which is left after shaping. However, this process has a problem in adhesion property, because the substrate can not be heated to a necessary temperature when the insulation layer is laminated. The organic insulation materials such as polyimide and the like also have problems in heat-resistance, and stabilities such as stability with time.

SUMMARY OF THE INVENTION

The present invention is to provide a novel method for planarization of the upper surface of the insulation layer on the electroconductive coil. In accordance with the present invention, there is provided a process for preparing a coil type thin film magnetic head holding a coil made from an electroconductive material between an upper and lower magnetic core made from a soft magnetic thin film, comprising;

forming a $SiO_2$ layer on a coil as an insulation layer by means of sputtering, plasma-CVD, or electron beam evaporation, coating a liquid type $SiO_2$ on the insulation layer and curing by heat, and dry-etching utilizing a fluorohydrocarbon gas.

Further, the process of the present invention may include the following step after dry-etching of additionally coating the coating-type $SiO_2$ on the insulation layer and the cured $SiO_2$ layer followed by curing by heat.

DETAILED DESCRIPTION OF THE PRESENT INVENTION

It has been proposed that the planarization process is carried out by using a coating type $SiO_2$. This process is simple and can be easily carried out, and the coating layer contains organic components in very little amount but it can be said that the coating layer is essentially inorganic. However, even by this process, it is not enough for thin film magnetic heads, having plural layered electroconductive coils or requiring strict magnetic properties of an upper magnetic core, to have the coating type SiO₂ applied only once. Two or more applications of the coatings can make it sufficiently flat, but it raises new problems such as a decline of wetting properties, cracks and the like. Accordingly, this process is not a complete solution.

According to the present invention, a dry-etching process by a fluorohydrocarbon gas is adopted after curing the coating type $SiO_2$ layer, whereby a more sufficient flatness is obtained.

The present invention is illustrated according to the preferred embodiment.

PREFERRED EMBODIMENT

Figure 1:
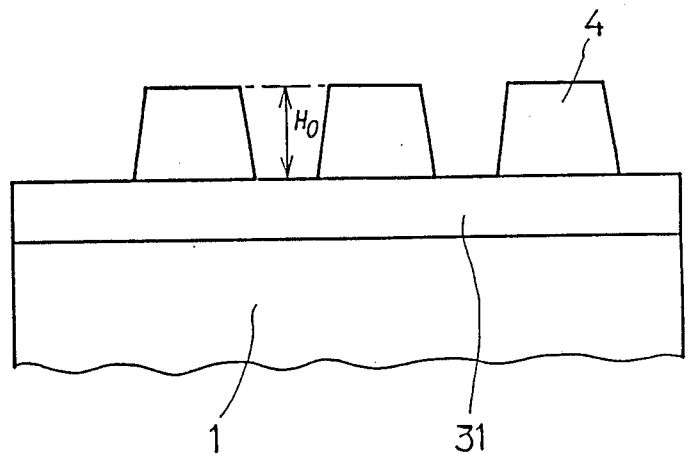
FIG. 1 is a process drawing of one embodiment of the present invention.
Figure 1:
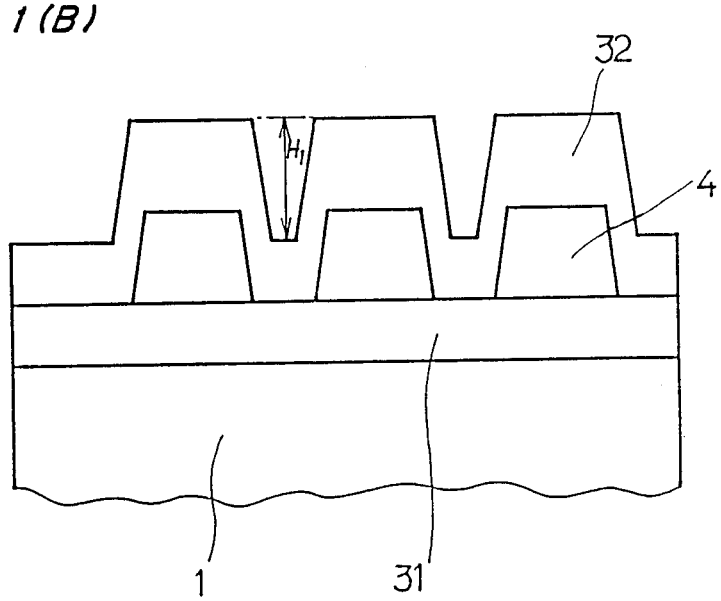
Figure 1C:
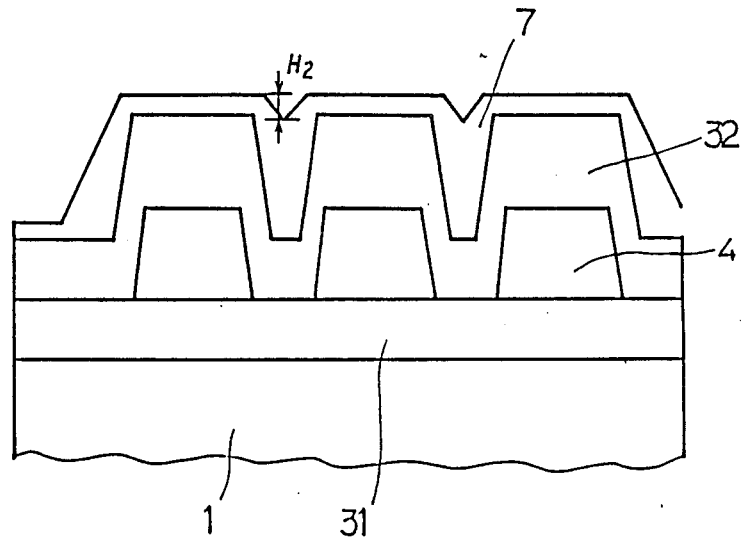
Figure 1D:
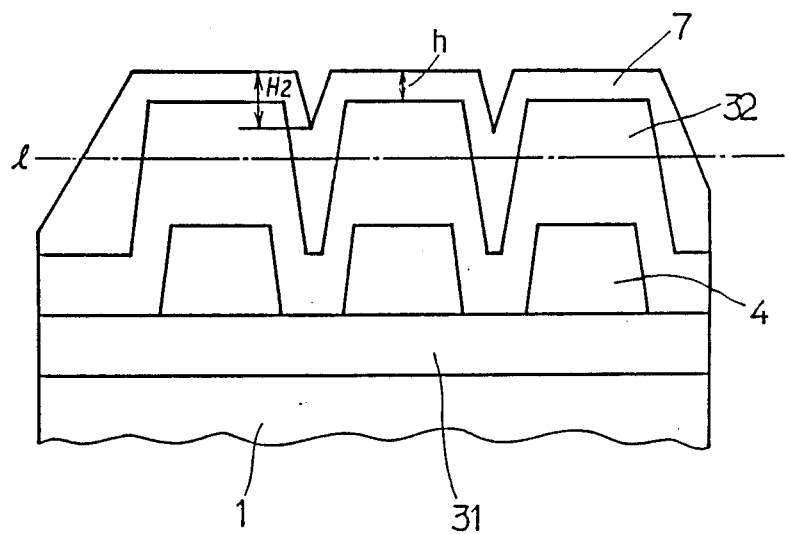
Figure 2:
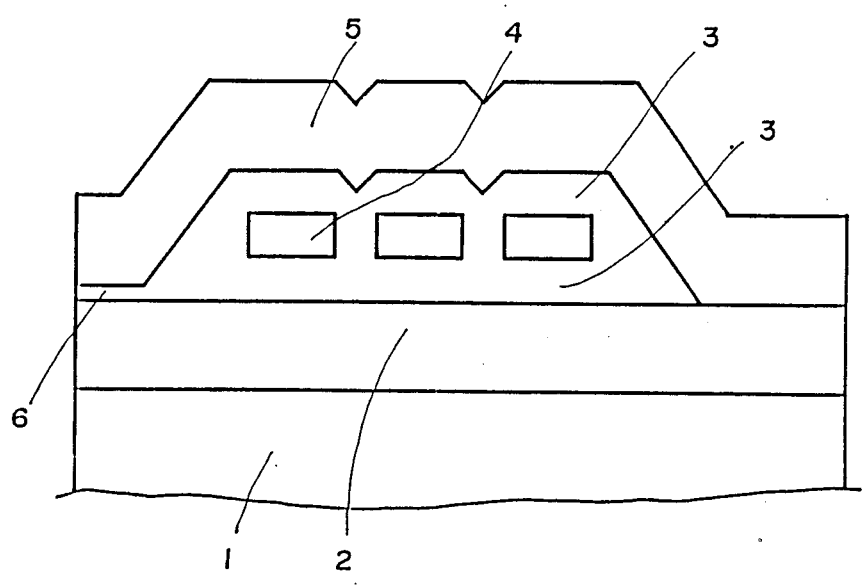
FIG. 2 shows a sectional view of a conventional thin film magnetic head which is not planarized sufficiently.

FIGS. 1 (A), (B), (C) and (D) are explanatory drawings showing the process of the present invention comprising forming an electroconductive coil, laminating an insulation layer, applying the coating type $SiO_2$, and heating said $SiO_2$ to cure. A substrate 1 is a ferrite plate or plates where a soft magnetic film is coated on a ferrite plate, an alumina plate or a glass plate. On the substrate 1, an insulation layer 31 made of $SiO_2$ and the like is laminated by the aid of a plasma-CVD, sputtering, electron beam evaporation and the like in a thickness of 1 to 2 μm. An electroconductive material layer made from Cu and the like is laminated on the insulation layer 31 by means of electron beam evaporation and sputtering, followed by etching it by ion beam etching or sputtering etching, using a mask such as a photo resist, or a metal thin film for example Ti, Cr and the like, to obtain a desired shape of the electroconductive coil 4. This state is shown in FIG. 1 (A). The thickness of the electroconductive coil 4 may be within the range of 1 to 5 m. The following explanation which follows supposes that the thickness of the coil 4 is 2 μm. Accordingly, the letter H in FIG. 1 (A) is 2 μm. FIG. 1 (B) shows that a $SiO_2$ layer 32 is laminated on the state FIG. 1 (A) by means of plasma-CVD, sputtering or electron beam evaporation. For example, when 2 μm of a $SiO_2$ layer is laminated by the plasma-CVD, the difference between the electroconductive coils, i.e. $H_1$, is 2.7 μm. The difference, $H_1$, becomes larger than $H_0$, because the deposition rate of $SiO_2$ is low in this part. The coating type $SiO_2$ 7 is formed and cured at an elevated temperature to make it flat, which is shown in FIG. 1 (C). When the planarization process is carried out by "Silica glass PMH" (commercially available from Tisso Co. Ltd.), the difference $H_2$ is about 0.5 μm, which shows that the difference is very improved. Such planarization degree is enough inasmuch as the pattern formed on the electroconductive coil is large or as the single layer coil construction is required. Further planarization has to be done either for the multilayered coil which requires microfabrication or for thin film magnetic heads having excellent magnetic properties of the upper magnetic core. If the application of the coating type $SiO_2$ is made once more on the state of FIG. 1 (C), the difference can be more improved in the amount of $H_2$ of 0.1 to 0.2 μm. However, the layer 7 of the coating type $SiO_2$ becomes thick enough to induce cracks. And also wetting properties become bad and in case of particular coatings, no wetting properties have been observed. The adhesion strength between the coating type $SiO_2$ layers is inferior in comparison with the adhesion strength between the coating type $SiO_2$ layer 7 and the insulation layer 32 formed by the plasma-CVD.

We have found that there was a difference in the dry-etching rate between the coating type $SiO_2$ 7 and the insulation $SiO_2$ layer formed by sputtering, plasma-CVD or electron beam evaporation. We have developed a new technique for planarization by utilizing this etching rate difference.

FIG. 1 (D) emphasizes the coating layer of $SiO_2$ of FIG. 1 (C). When the coating type $SiO_2$, "PMH" series mentioned before, is used, the thickness h of the $SiO_2$ coating is about 0.1 μm above the electroconductive coil 4. After the $SiO_2$ coating layer 7 is etched about 0.1 μm over the wafer, the $SiO_2$ layer made by the plasma-CVD appears above the electroconductive coil 4 while the $SiO_2$ coating still remains between the coils. If the plasma-CVD made $SiO_2$ layer is etched faster than the coated $SiO_2$ layer, the planarization can be done in the difference of the etching rates. For example, when reactive ion etching is carried out by a parallel plate type dry etching apparatus using $CHF_3$ gas at the gas pressure of 30 mTorr and at the power of 175 W, the etching rate is about 500 Å/min with the plasma-CVD deposited $SiO_2$ layer, and about 250 Å/min with the coated $SiO_2$ layer, cured at 350° C. The difference in level in question will disappear at the rate of 250 Å/min. The etching continues to the broken line of FIG. 1 (D). In this etching process, the etching rates can vary respectively. For example, the plasma-CVD deposited $SiO_2$ layer can vary according to deposition conditions. The coated $SiO_2$ layer may also vary according to curing conditions and may vary widely according to its compositions. If the PM series coating type $SiO_2$ available from Tisso Co. Ltd. is employed, the etching rate of 700 to 800 Å/min can be accomplished according to the etching condition mentioned herein before, which makes it faster than that of the plasma-CVD deposited $SiO_2$ layer. In addition, the etching rate can also change according to etching conditions, such as gases to be used, gas pressures and the like.

Although it seems that the planarization process utilizing the differences of the etching rate according to the present invention works only if the difference of the etching rate is existent between the coated $SiO_2$ layer and the plasma-CVD deposited $SiO_2$ layer, it is effective independent to the etching rates as follows: The etching process of the present invention may prevent decline of wetting properties and development of cracks. The decline of wetting properties and adhesion strength is caused by the coated $SiO_2$ layer existent throughout the surface and the development of cracks is caused by a thick layer of the coated $SiO_2$. According to the etching process of the present invention, the unnecessary coated layer can be etched off to prevent the problems mentioned above. As far as overetching is not made, the etching back of the present invention does not damage its flatness.

Even if the etching back mentioned before is carried out, the difference in level is microscopically remained. In order to remove the differences in level, further embodiment of the present invention has a further step in which another $SiO_2$ is coated after the etching back. This process provides for a more flat surface.

Figure 3:
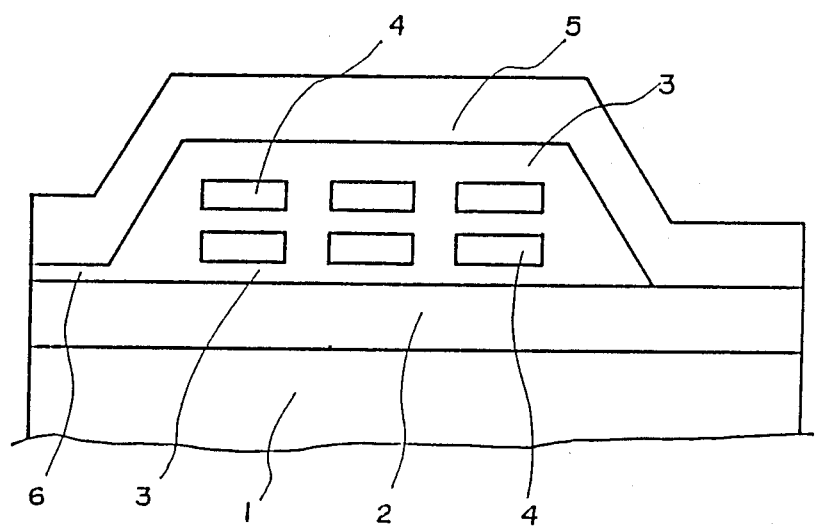
FIG. 3 shows a sectional view of one embodiment of the thin film magnetic head according to the process of the present invention.

FIG. 3 shows a thin film magnetic head having double layered electroconductive coils which is planarized by recoating the $SiO_2$ after etching back according to the present invention. In the second coil layer of this thin film magnetic head, the etching back and the planarization by the recoating of $SiO_2$ is also effected to obtain good magnetic properties of the upper magnetic core.

What is claimed is:

1. A process for preparing a layered coil type thin film magnetic head, comprising:
    forming a lower magnetic core on a substrate;
    providing a first insulation layer on said lower magnetic core;
    providing an electroconductive coil on said first insulation layer;
    providing a second insulation layer on said electroconductive core said second insulation layer being a $SiO_2$ layer formed by means of sputtering, plasma-CVD or electron beam evaporation;
    coating a liquid type $SiO_2$ on said second insulation layer, curing said coated $SiO_2$ layer by heat, and dry-etching the cured $SiO_2$ layer to plane its surface and, forming an upper magnetic core on said coated $SiO_2$ layer.

2. The process of claim 1, further including coating with a second coating of liquid type $SiO_2$, followed by heat curing, and dry-etching said second cured $SiO_2$ layer.

3. A coil type thin film magnetic head prepared by the process of claim 2.

4. A coil type thin film magnetic head prepared by the process of claim 1.

* * * * *